United States Patent

Smith

Patent Number: 5,887,799
Date of Patent: Mar. 30, 1999

[54] DUAL FUEL INJECTOR

[75] Inventor: David H. Smith, Mercer Island, Wash.

[73] Assignee: IMPCO Technoligies, Inc., Cerritos, Calif.

[21] Appl. No.: 927,190

[22] Filed: Sep. 11, 1997

[51] Int. Cl.⁶ .......................... F02M 13/00; F02M 45/00
[52] U.S. Cl. ........................ 239/585.1; 123/575
[58] Field of Search .................. 239/385.1, 446, 239/447, 414, 585.4; 123/575, 526; 251/129.02

[56] References Cited

U.S. PATENT DOCUMENTS

| Re. 34,261 | 5/1993 | Sule | 137/625.5 |
|---|---|---|---|
| 1,769,910 | 7/1930 | Ponsonby et al. | 137/129.02 |
| 3,215,352 | 11/1965 | Meraz et al. | 239/414 |
| 4,646,976 | 3/1987 | Rambold et al. | 137/129.02 |
| 4,742,801 | 5/1988 | Kolgrad | 123/27 GE |
| 4,925,252 | 5/1990 | Hee | 251/129.02 |
| 4,966,103 | 10/1990 | Schaub et al. | 123/276 |
| 5,400,970 | 3/1995 | Alt et al. | 239/585.1 |

*Primary Examiner*—Kevin Weldon
*Attorney, Agent, or Firm*—Edward A. Sokolski

[57] ABSTRACT

A dual fuel injector for an engine is selectively controlled to either inject a liquid fuel such as gasoline or a gaseous fuel such as butane or propane to the engine. The injection of one fuel or the other is effected by alternatively feeding a pulsating voltage of one polarity or he other to the coil of an electrically controlled injector. The injector has a permanent magnet armature which is driven in one direction in response to pulses fed to its surrounding coil of one polarity and the opposite direction in response to pulses fed to the coil of the other polarity. When the armature is driven in a first direction, it drives a pintle attached thereto in that direction. The pintle in turn drives against a spring urged valve to open this valve, thereby permitting gasoline to pass through the control injector from where it is injected into the engine in a pulsating manner. When the armature is driven in an opposite direction, it drives a pintle in this same opposite direction against a second spring urged valve to open this valve to permit pulsating gaseous fuel to pass through the injector to the engine.

6 Claims, 3 Drawing Sheets

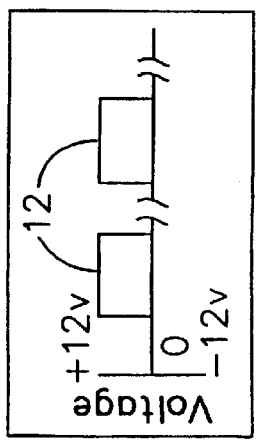
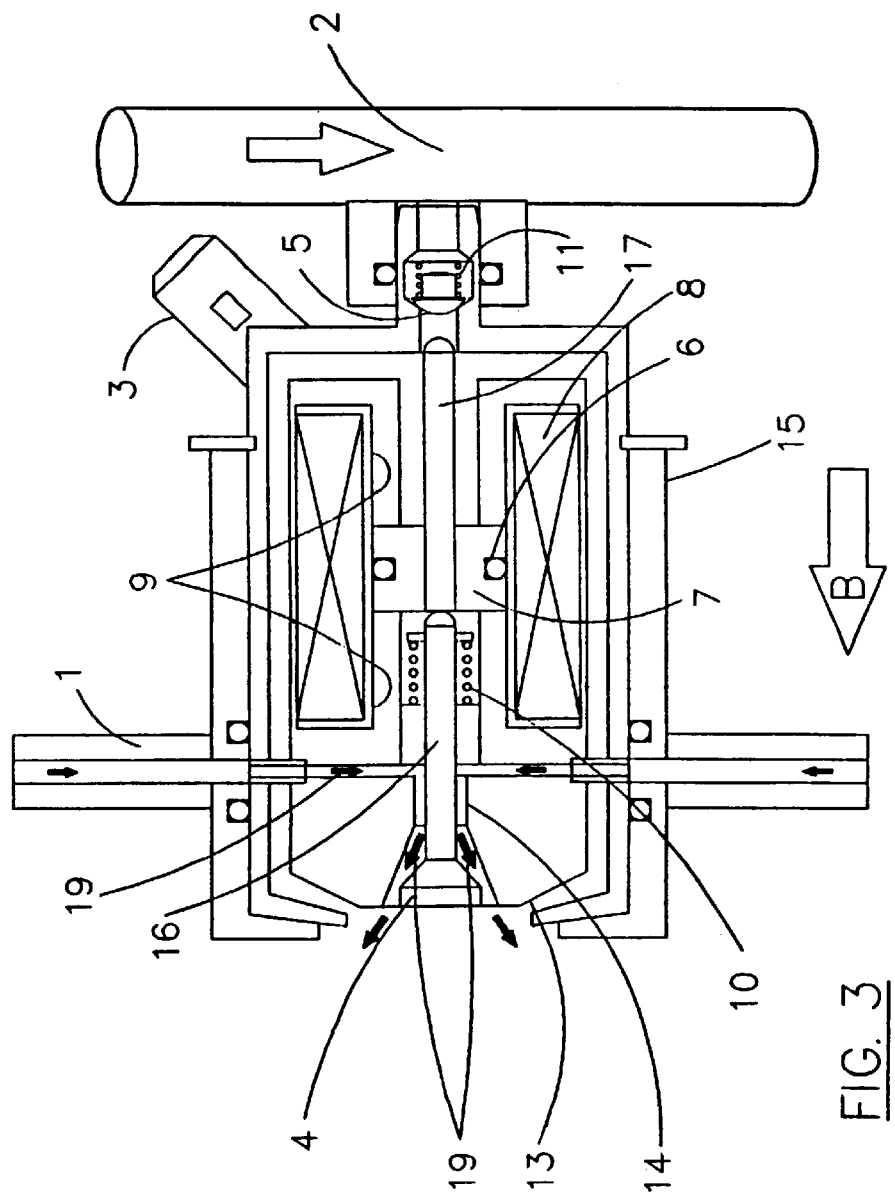

DUAL FUEL INJECTOR

BACKGROUND OF THE INVENTION

1. Field of the Invention

This invention relates to engine fuel injectors and more particularly to such an injector which can alternatively be operated to inject either liquid or gaseous fuel into an engine.

2. Description of the Related Art

Dual fuel injection systems for engines are commonly used to enable the use of either gasoline or a gaseous fuel. Gaseous fuel has advantages over gasoline in that its cost is generally lower and it produces an exhaust gas having substantially lower pollutants than that of gasoline. However, it is desirable to also utilize gasoline in view of the fact that it is readily available on the road which is not the case with gaseous fuel.

In prior art dual fuel systems, two separate fuel injectors and associated electronic control systems are generally required, one for each of the fuels. Such a prior art system is described in U.S. Pat. No. 5,450,832 issued Sep. 19, 1995 to Graf. The use of a separate fuel injector for each of the fuels increases both the cost and complexity of the system and also often has the disadvantage of requiring indirect routing for the liquid fuel to the engine manifold which leads to partial vaporization of the fuel which hampers the control of fuel delivery and leads to fuel waste.

SUMMARY OF THE INVENTION

The device of the present invention overcomes the aforementioned shortcomings of the prior art by utilizing a single fuel injector which alternatively handles the delivery of either liquid or gaseous fuel to the engine. This end result is achieved by utilizing a permanent magnet armature which is linearly driven by a surrounding coil alternatively in one direction or an opposite direction depending on the polarity of the electrical input to the coil. A valve for controlling the input to the injector of liquid fuel is positioned opposite one end of the armature while a valve for controlling the input to the injector of gaseous fuel is positioned opposite the other end of the armature. A pintle is attached to the armature, each of the pintles abutting against a respective one of the valves. The valves are mechanical and are resiliently urged to their closed positions by means of springs.

When a pulsating electrical control signal of one polarity is fed to the coil, the armature is driven linearly in a first direction to drive the valve controlling the feeding of liquid fuel through the injector. When a pulsating electrical control signal of the opposite polarity is fed the to the coil, the armature is driven linearly in a direction opposite to the first direction thereby driving the valve controlling the feeding of gaseous fuel through the injector. Except when they are being driven by their associated pintles, the two valves are maintained in their closed positions by the drive action of the associated springs. The pulsating control signals are generated in conventional fashion by the fuel injection control system of the engine.

It is therefore an objection of this invention to provide an improved dual fuel injection system in which the same injector is used for handling both fuels.

It is a further object of this invention to improve the efficiency of operation of dual fuel injection systems.

Other objects of the invention will become apparent in view of the following description taken in connection with the accompanying drawings.

DESCRIPTION OF THE DRAWINGS

FIG. 3 is a schematic illustration showing the preferred embodiment operating in its mode for feeding liquid fuel; and FIG; 3A is a schematic illustration of the pulsating input which drives the armature to the position shown in FIG,3.

DETAILED DESCRIPTION OF THE INVENTION

Figure 1:
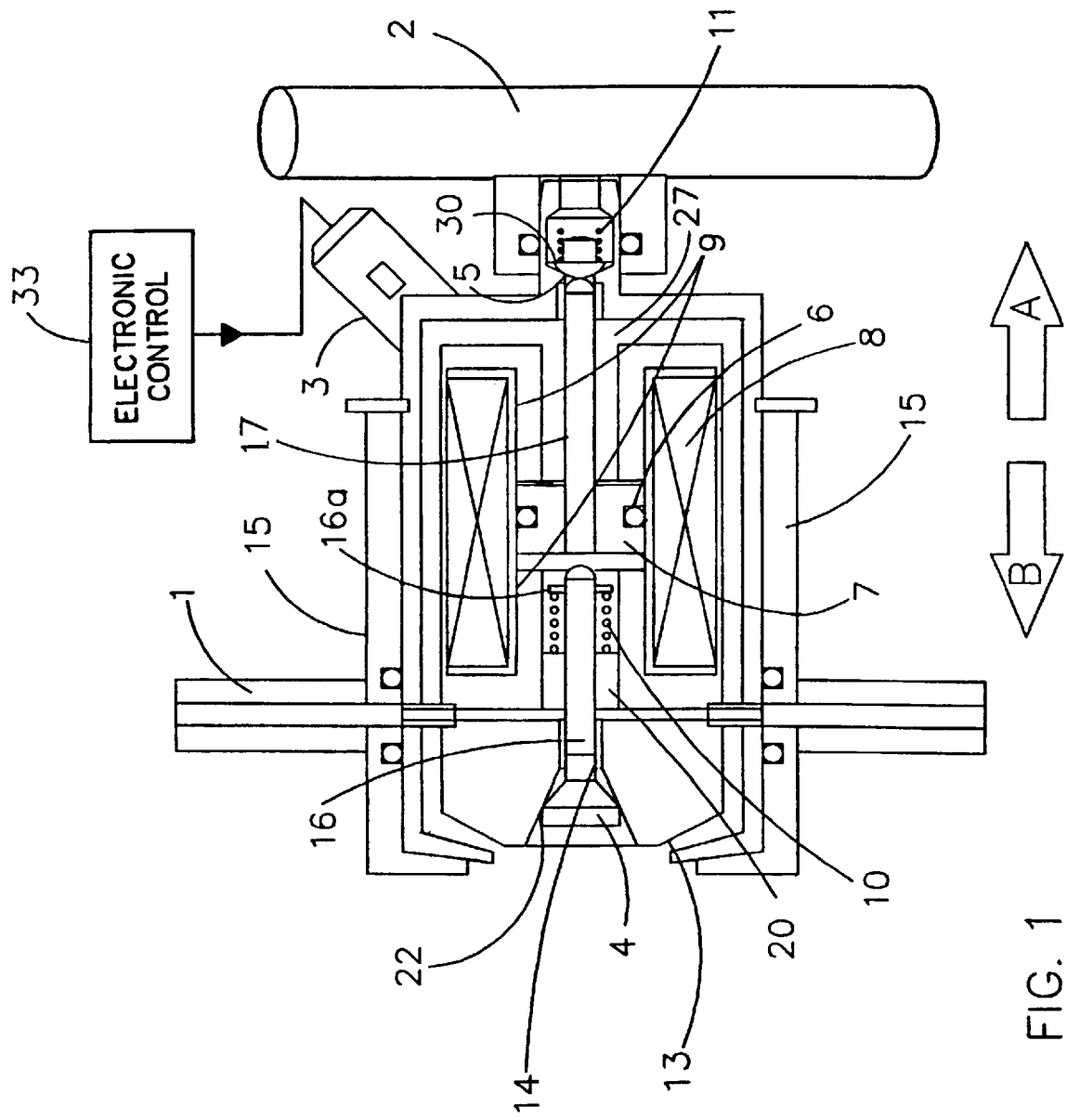
FIG. 1 is a schematic illustration showing a preferred embodiment of the invention in its neutral non-activated mode.

Referring now to FIG. 1, a preferred embodiment of the invention is illustrated. As shown in this Figure, the device is in a neutral mode with neither the liquid or gaseous fuel feeds being activated.

The device is housed in a receptacle 15. Fixedly mounted in the housing is a coil assembly 8 which has pole faces 9. A permanent magnet cylindrical armature 7 is slidably mounted within the tubular coil. An O-ring 6 is mounted in a groove on the outer wall of the armature to provide a fluid tight seal between the opposite ends of the armature. A first valve 4 is attached to pintle 16 which is slidably mounted in fixed bearing member 20. Spring 10 is positioned between bearing member 20 and ring member 16a, which is fixed attached to the pintle. The spring thus urges the pintle towards armature 7 and draws valve 7 tightly against its seat 22 to maintain the valve in a closed position.

Pintle 17 is slidably mounted in fixed sleeve 27. The pintle is fixedly attached to a wall of the armature at one end thereof and abuts against valve 5, at the other end thereof. It is to be noted that the armature is made of a permanent magnetic material such as selenium-cobalt. In the absence of an electrical input signal, the armature is held in the center of the coil by the armature's permanent magnetic field which tends to produce a net centering force as well as by the springs 10 and 11. Spring 11 mounted within valve 5 urges the valve to a closed position against valve seat 30. Gaseous fuel(propane, butane), as to be explained in connection with FIG.2, is fed into the injector from fuel rail 2 through valve 5 while liquid fuel(gasoline) is fed into the injector from fuel rail 1 through valve 4. Control signals for operating the device are fed from electronic control 33, which may comprise a conventional computerized injection control, into the injector through electrical pin connector 3.

Figure 2A:
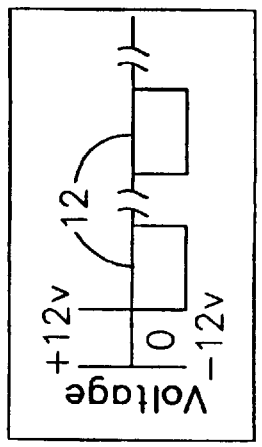
FIG. 2A is a schematic illustration of the pulsating voltage input which drives the armature to the position shown in FIG.2.
Figure 2:
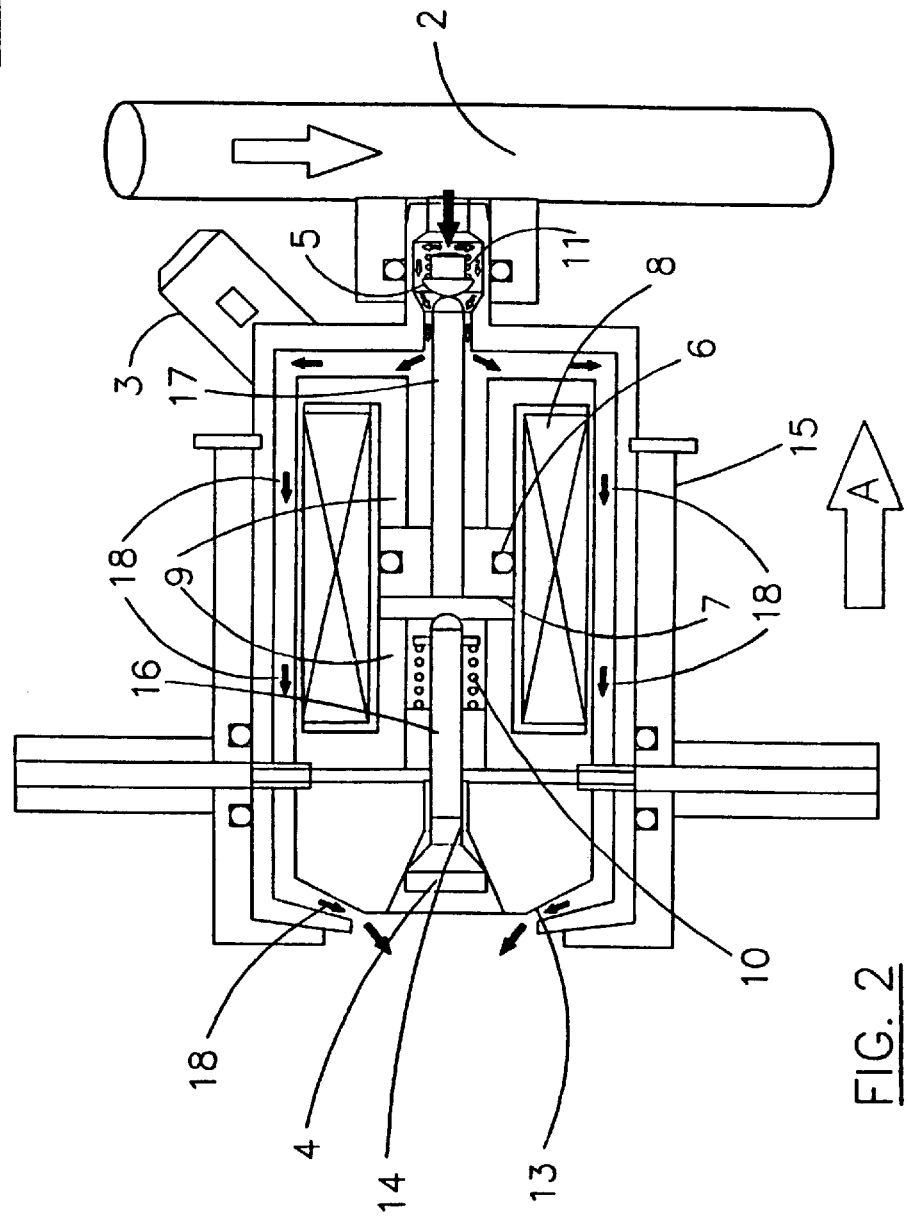
FIG. 2 is a schematic illustration showing a preferred embodiment of the invention operating in its mode for feeding gaseous fuel.

Referring now to FIG.2 and 2A, the use of the device of the invention in feeding gaseous fuel through the injector is illustrated. When gaseous fuel delivery is required, electrical pulsating signals 12, as shown in FIG. 2A, which in this case are negative, are fed through electrical pin connector 3 to coil 8. These negatively polarized signals cause armature 7 to move to the right(as indicated by arrow "A"), thereby driving pintle 17 against valve 5 to drive this valve off its seat. Valve 5 thereby opens and allows gaseous fuel from gas fuel rail 2 to pass into the injector and through the passageways surrounding the coil and finally out the fuel metering orifice 13, as indicated by arrows 18.

Referring now to FIGS. 3 and 3A, the system is shown in its mode for delivering liquid fuel such as gasoline. As shown in FIG. 3A, electrical pulses 12 are positive in polarity and are fed through electrical connector 3 to coil 8. In response to the positive pulses, the armature moves towards the left(as indicated by arrow "B") driving pintle 16, which is connected to valve 4, so as to unseat the valve and bring it to an open position against the spring action of spring 10. Gasoline now is fed from gasoline fuel rail 1 through metering orifice 14 and out of the injector through valve 4, as indicated by arrows 19.

The design of the electrical injector driver is arranged as a reversible polarity "peak and hold" driver; i.e. the driver form is generally similar to an H-bridge configuration, but one where the initial current shape allows the current to rise freely for a short duration approximately equal to the injector opening time, and then the current is clamped at a lower value for the rest of the pulse sufficient to just hold the valve being operated open. In this manner, it is possible to instantaneously change, pulse by pulse, from one fuel to the other, and back again as may be required.

While the invention has been described and illustrate in detail it is to be understand that this is intended by way of illustration and example only, the scope of the invention being limited by the terms of the following claims.

I claim:

1. A dual fuel injector for use in alternatively feeding either liquid or gaseous fuel to an engine comprising:

an electrically controlled injector having an armature and a coil surrounding said armature;

a first valve for controlling the passage of liquid fuel therethrough;

means for resiliently urging said first valve to a closed position whereat fuel cannot pass therethrough;

a second valve for controlling the passage of gaseous fuel therethrough;

means for resiliently urging said second valve to a closed position;

first and second drive pintles positioned in opposing relationship with each other and opposite said armature; and means for selectively applying an electrical signal of one polarity or a polarity opposite said one polarity to said coil to drive said armature and said pintles in one direction or a direction opposite said one direction respectively;

said first drive pintle driving said first valve open when said armature is driven in said first direction thereby feeding liquid fuel through said injector, said second drive pintle driving said second valve open when said armature is driven in said opposite direction, thereby feeding gaseous fuel through said injector, said first valve being closed when said first valve is open and said second valve being closed when said first valve is open.

2. The fuel injector of claim 1 wherein said means for resiliently urging said first and second valves comprises springs.

3. The fuel injector of claim 1 wherein said electrical signals are pulses.

4. The fuel injector of claim 1 wherein said valves are mechanical valves and said means for resiliently urging said valves to a closed position are springs.

5. The fuel injector of claim 1 wherein said armature comprises a permanent magnet.

6. A dual fuel injector for use in alternatively feeding either liquid or gaseous fuel therethrough to an engine comprising:

an electrically operated injector having a permanent magnet armature and a drive coil surrounding said armature for linearly driving said armature in one direction or the direction opposite said one direction;

a first mechanically operable valve for controlling the passage of liquid fuel through the injector;

a second mechanically operable valve for controlling the passage of gaseous fuel through said injector;

separate spring means for resiliently urging each of said valves to a closed position;

first and second drive pintles in opposing relationship to each other and positioned opposite said armature;

means for selectively applying a pulsating signal of either one polarity or a polarity opposite said one polarity to the coil of said injector, thereby driving said injector armature in either one direction or a direction opposite said one direction respectively, said first drive pintle driving said first valve open when the armature is driven in said first direction, thereby feeding liquid fuel through said injector, said second drive pintle driving said second valve open when the armature is driven in a direction opposite said first direction, thereby feeding gaseous fuel through said injector.

* * * * *